(12) United States Patent
Stemme et al.

(10) Patent No.: US 10,220,389 B2
(45) Date of Patent: Mar. 5, 2019

(54) MICROFLUIDIC DEVICE, USE AND METHODS

(71) Applicant: Capitainer AB, Stockholm (SE)

(72) Inventors: Göran Stemme, Lidingö (SE); Gabriel Lenk, Stockholm (SE); Olof Beck, Saltsjö-Bo (SE); Niclas Roxhed, Bromma (SE)

(73) Assignee: CAPITAINER AB, Stockholm (SE)

( * ) Notice: Subject to any disclaimer, the term of this patent is extended or adjusted under 35 U.S.C. 154(b) by 17 days.

(21) Appl. No.: 15/025,524

(22) PCT Filed: Sep. 30, 2014

(86) PCT No.: PCT/EP2014/070937
§ 371 (c)(1),
(2) Date: Mar. 28, 2016

(87) PCT Pub. No.: WO2015/044454
PCT Pub. Date: Apr. 2, 2015

(65) Prior Publication Data
US 2016/0279634 A1 Sep. 29, 2016

(30) Foreign Application Priority Data
Sep. 30, 2013 (SE) ...................................... 1300623

(51) Int. Cl.
*B01L 99/00* (2010.01)
*B01L 3/00* (2006.01)
*F16K 99/00* (2006.01)

(52) U.S. Cl.
CPC ..... *B01L 3/502738* (2013.01); *B01L 3/50273* (2013.01); *B01L 3/502715* (2013.01);
(Continued)

(58) Field of Classification Search
None
See application file for complete search history.

(56) References Cited

U.S. PATENT DOCUMENTS

| | | | |
|---|---|---|---|
| 6,632,399 B1 | 10/2003 | Kellogg et al. | |
| 8,312,890 B1 | 11/2012 | Lau | |

(Continued)

FOREIGN PATENT DOCUMENTS

| | | |
|---|---|---|
| WO | 2012/178187 A1 | 12/2012 |
| WO | 2012/164086 A1 | 12/2016 |

OTHER PUBLICATIONS

Official Action dated Jun. 15, 2018 from corresponding European Application No. 14777351.9.

*Primary Examiner* — Paul S Hyun
(74) *Attorney, Agent, or Firm* — Porter Wright Morris & Arthur LLP

(57) ABSTRACT

A microfluidic device comprises an inlet port for liquid, and a capillary channel in fluid connection to the inlet port for receiving liquid from the inlet port, the channel having a defined volume. At least one dissolvable valve is provided comprising a dissolvable membrane having a first side oriented towards the capillary channel, and a capillary connected to the second side of the dissolvable membrane such that when the membrane is dissolved by the liquid, liquid is transported through the valve to the second side of the membrane by capillary action. A method of controlling a flow of liquid uses such a microfluidic device.

17 Claims, 6 Drawing Sheets

(52) U.S. Cl.
CPC ...... *B01L 3/502753* (2013.01); *F16K 99/003* (2013.01); *F16K 99/0057* (2013.01); *B01L 2200/0605* (2013.01); *B01L 2300/069* (2013.01); *B01L 2300/0816* (2013.01); *B01L 2300/0838* (2013.01); *B01L 2300/0861* (2013.01); *B01L 2300/0864* (2013.01); *B01L 2300/0887* (2013.01); *B01L 2300/126* (2013.01); *B01L 2300/161* (2013.01); *B01L 2400/0406* (2013.01); *B01L 2400/0677* (2013.01); *F16K 2099/0084* (2013.01); *F16K 2099/0086* (2013.01)

(56) References Cited

U.S. PATENT DOCUMENTS

| | | |
|---|---|---|
| 2005/0106713 A1 | 5/2005 | Phan et al. |
| 2007/0026439 A1 | 2/2007 | Faulstich et al. |
| 2012/0028342 A1* | 2/2012 | Ismagilov ......... B01L 3/502738 435/283.1 |

* cited by examiner

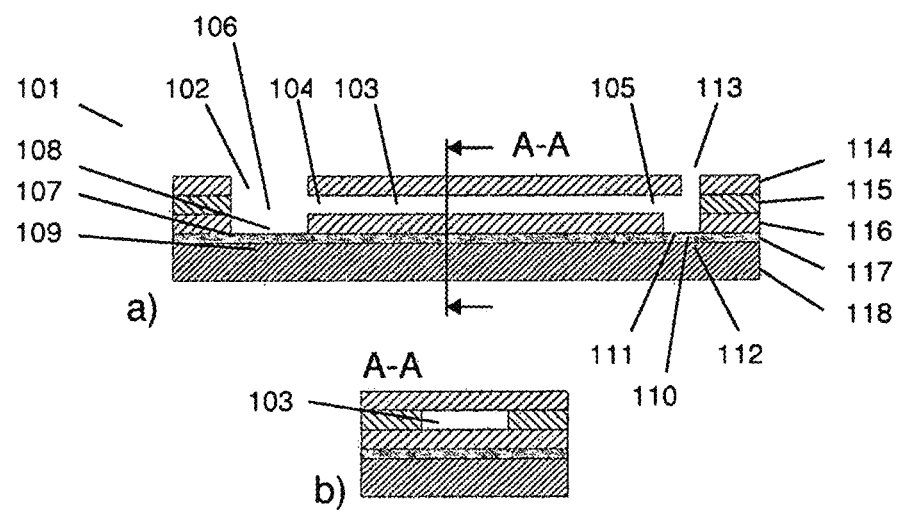
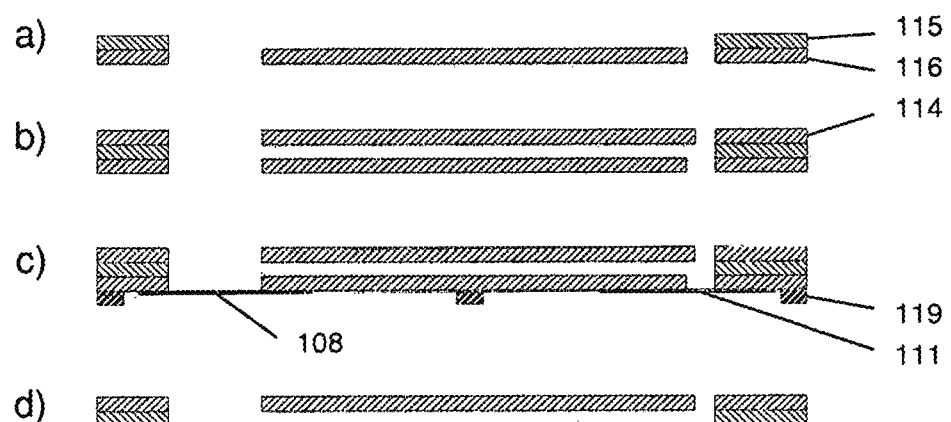
Fig. 2

Fig. 6 (a)-(e)

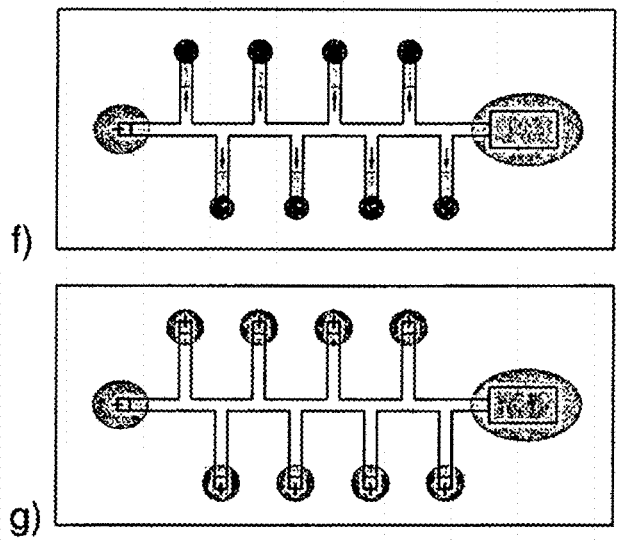
Fig. 6 (f)-(g)
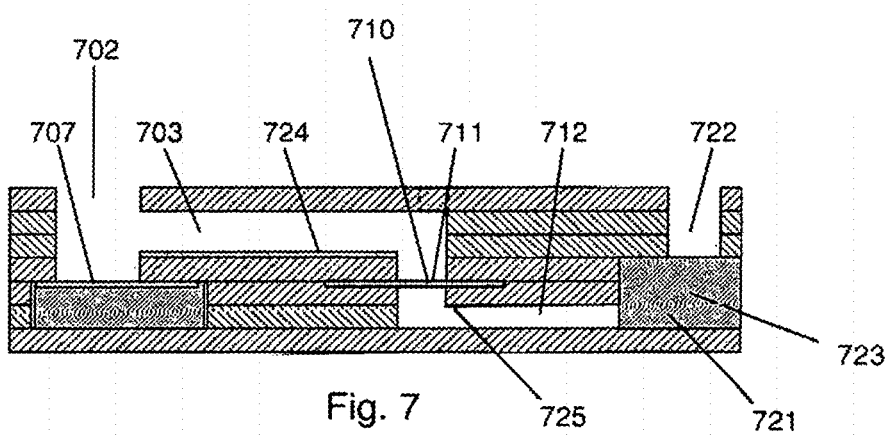
Fig. 7
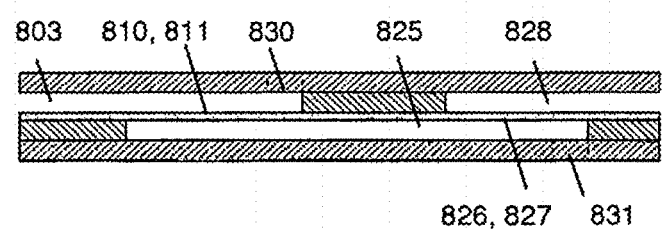
Fig. 8

US 10,220,389 B2

MICROFLUIDIC DEVICE, USE AND METHODS

TECHNICAL FIELD

The present invention relates generally to a microfluidic device for liquids, comprising dissolvable material to control liquid flow in the device, to the use of the device and to methods of fabrication and of controlling a flow of liquid in a microfluidic device.

BACKGROUND ART

Microfluidic devices are used in a wide range of applications. Typically, a microfluidic device is defined to handle small fluid volumes (µL, nL, pL etc.), have a small size with at least one dimension in the micrometer range, and/or use effects of the micro domain. In such devices fluids may be moved, mixed, separated or otherwise processed. Numerous applications employ passive fluid control techniques like capillary forces.

One important area of us of microfluidics is in medical devices. Microfluidic devices may be used in analytical or therapeutical applications, e.g. to administer medications or to handle samples of bodily fluids.

In many applications it may be important to be able to define volumes of liquids to be handled and processed by the microfluidic device. However, today there is still a problem to find a simple and efficient solution to defining a liquid volume in such a device.

SUMMARY OF INVENTION

An object of the present invention is thus to provide a simple solution to defining a volume of liquid in a microfluidic device.

Thus the invention relates to a microfluidic device comprising an inlet port for liquid, a capillary channel in fluid connection to the inlet port for receiving liquid from the inlet port, the channel having a defined volume, at least one dissolvable valve comprising a dissolvable membrane. The dissolvable membrane comprises material dissolvable by the liquid and has a first side oriented towards, i.e. facing, the capillary channel. A capillary means is connected to the second side of the dissolvable membrane such that when the membrane is dissolved by the liquid, liquid is transported through the valve to the second side of the membrane by capillary action.

The dissolvable membrane with the capillary means thus form a dissolvable valve. The capillary channel and the dissolvable valve cooperate to define a volume of liquid transported through the capillary channel. Thus the volume of liquid transported through the capillary channel is a portion of the liquid supplied to the inlet port.

The inlet port of the device may e.g. be an opening for receiving liquid. The capillary channel is suitable for metering a volume of liquid drawn therein by capillary action from the inlet port. The dissolvable membrane has a lateral extension which is larger than a thickness dimension of the membrane in order to facilitate dissolution and fabrication of the device. It thus has a first and a second side. The material of the membrane is dissolvable by liquid in a time frame that is reasonable for the device to function, i.e. less than 1 hour, less than 10 minutes or less than 1 minute, depending on application. By dissolving the membrane it is understood that the membrane is dissolved sufficiently to uncover the capillary means connected to the second side of the membrane. With capillary it is meant a structure which is configured to drive liquid flow by capillary action.

The microfluidic device may comprise an air vent before each dissolvable membrane to allow for capillary filling of liquid up to the membrane.

The inlet port may comprise an inlet chamber for receiving liquid and wherein the at least one dissolvable valve connected to the inlet chamber, for transporting liquid from the inlet chamber when the membrane is dissolved.

Thus the dissolvable membrane may be used to remove liquid from the inlet chamber, which has not entered into the capillary channel, thus providing a "pinch-off" effect of liquid in the capillary channel to define a volume already entered into the capillary channel.

The capillary channel may have an inlet portion, connected to the inlet port, and an outlet portion, and wherein the at least one dissolvable valve is in capillary connection to the outlet portion of the capillary channel, and arranged for transporting liquid from the capillary channel when the membrane is dissolved.

Thus the capillary channel may be filled to define a volume of liquid in the device, followed by release of the volume of liquid through the dissolvable membrane.

The capillary channel may have an inlet portion, connected to the inlet port, and an outlet portion, wherein the inlet port may comprise an inlet chamber for receiving liquid and wherein a first dissolvable valve is connected to the inlet chamber, for transporting liquid from the inlet chamber when the membrane is dissolved, and wherein a second dissolvable valve is in capillary connection to the outlet portion of the capillary channel, and arranged for transporting liquid from the capillary channel when the membrane is dissolved. The dissolvable membranes of the valves and the capillary channel are configured such that the membrane of the first valve is dissolved before the membrane of the second valve by a liquid supplied to the inlet port.

The capillary means may comprise at least one capillary channel or a structure that allows capillary filling, such as a porous absorbent material, preferably an absorbent paper matrix.

Thus liquid may be effectively transported over the dissolvable membrane once dissolved. Liquid may e.g. be collected in the porous material for further analysis.

The device may comprises a plurality of capillary channels arranged in parallel connected to a respective plurality of dissolvable valves, wherein capillary means of the dissolvable valves are connected to collect liquid from the valves.

Thus the liquid volumes defined before the valves may be released sequentially or in parallel e.g. to perform a predetermined sequence of reactions in the device.

The microfluidic device may comprise a plurality of dissolvable valves, distributed along a capillary flow path of liquid in the microfluidic device, comprising the capillary channel.

Thus sequential processing of liquid in the device may be performed.

The capillary channel may comprise a branched capillary channel structure comprising a plurality of side arms capillary connected to the plurality of dissolvable valves.

Thus the liquid volume may be divided into a plurality of sub volumes for further processing in the device.

The dissolution times of the plurality of dissolvable membranes of the valves may be individually tailored to provide a predetermined timing of events in the microfluidic device. The plurality of dissolvable membranes of the valves may be individually tailored with different membrane thicknesses to provide the different dissolution times.

Thus fluidic operations may be performed in a timed and sequential fashion to allow for advanced fluidic multistep procedures in the device.

The first side of the at least one dissolvable membrane of the valve may be connected to a capillary dead end channel, configured such that liquid dissolving the membrane is transported into the capillary dead end channel by capillary forces.

Thus liquid loaded with dissolved material of the membrane may be led into the capillary dead end channel to allow for liquid having less amount of dissolved material to propagate through the membrane once dissolved. Thus, e.g. the viscosity of the liquid may be maintained.

If the device comprises a plurality of the dissolvable membranes, more than one dissolvable membrane may be connected to a respective capillary dead end channel.

Thus, at every dissolvable membrane, e.g. along a flow path of liquid in the device, the liquid loaded with dissolved material of the membrane may be led into a respective capillary dead end channel.

The material of the dissolvable membrane may be dissolvable by bodily fluid, when the liquid is a bodily fluid, such as blood.

The material of the dissolvable membrane may comprise polyvinyl alcohol (PVA), dissolvable polysaccharides, gelatin and the like.

The material of the dissolvable membrane may comprise at least one substance to be released into the liquid, such as one or more regents and/or one or more particles.

Thus, once dissolved, the substance may be released into the liquid passing the membrane.

At least one region of dissolvable material comprising at least one substance to be released into the liquid, such one or more regents and/or one or more particles, may be distributed along a flow path of liquid in the microfluidic device.

Thus the device may be provided with substance-loaded dissolvable material at various regions along a flow path of liquid in the device, to be released by liquid dissolving the dissolvable material. The material may e.g. be provided as films along a fluid channel or in a fluid chamber.

The membrane of the valve or dissolvable region may comprise a multilayer structure comprising different substances to be released into the liquid.

The device may comprise at least one at least one storage of a substance, such as one or more regents and/or one or more particles, and at least one dissolvable membrane provided to seal the at least one storage, wherein the substance is to be released into the liquid by dissolving the membrane.

Thus the release of liquid substances into the liquid may be triggered by liquid dissolving a membrane sealing a storage chamber for the substance.

The microfluidic device may comprise a laminate of layers of material defining a flow path for the liquid and comprising at least one layer of dissolvable material forming the at least one dissolvable membrane.

Thus one or more membranes may be formed in a simple manner in the microfluidic device.

The microfluidic device may comprise a plurality of dissolvable membranes formed by one and the same layer of dissolvable material in the microfluidic device.

The capillary flow path in the microfluidic device may comprise capillary channels on both sides of the dissolvable membrane layer, wherein a plurality of dissolvable valves are formed at flow path crossings across the dissolvable membrane layer.

Thus a plurality of dissolvable membranes and capillary channels may be formed in a simple manner in the device.

The microfluidic device may comprise a plasma separation membrane for separating plasma from the liquid, the liquid being whole blood. The plasma separation membrane may be provided before or after a dissolvable membrane.

The invention further relates to a microfluidic device comprising a metering capillary channel having a first and a second end an inlet port for liquid, which is connected to the first end of the metering capillary channel, a first dissolvable membrane connected to the inlet port, an outlet port connected to the second end of the metering capillary channel, a second dissolvable membrane connected to the outlet port, capillary means for removing liquid from the inlet port and the outlet port when the respective dissolvable membrane is dissolved by the liquid, wherein the dissolvable membranes and the metering capillary channel are configured such that the first membrane is dissolved before the second membrane by a liquid supplied to the inlet port.

Thereby liquid provided at the inlet port starts dissolving the first dissolvable membrane while a portion of liquid provided at the inlet port is drawn into the capillary channel to reach the second dissolvable membrane. The device is configured such that the first dissolvable membrane is dissolved by liquid at the inlet port before the second dissolvable membrane is dissolved by liquid drawn in through the capillary channel. Thus excess liquid is transported from the inlet port through the first dissolved membrane by the capillary means for removing liquid from the inlet port. The volume of liquid in the capillary channel is thus "pinched off", i.e. forming a free liquid surface facing the inlet port. Thereafter the second dissolvable membrane is dissolved, whereby the defined volume of liquid in the metering capillary is drawn from the capillary channel by the capillary means for removing liquid from the outlet port. A defined volume of liquid is thus separated from the undefined volume of liquid provided at the inlet port.

In other words, the invention relates to a micro fluidic device comprising an inlet port which is connected to a first end of at least one metering capillary channel (having a first and a second end) and a first side of a first dissolvable membrane (having a first and a second side) and where the second end of the metering capillary channel is connected to a vent port and a first side of a second dissolvable membrane. The second sides of the membranes are connected to channels, structures or materials with capillary functionality. The dimensions of the metering channel and the material, thicknesses and areas of the dissolvable membranes are chosen so that the first membrane is dissolved before the second membrane when a liquid is presented to the inlet port.

The invention further relates to device for metering liquids comprising an inlet port and a microfluidic channel, where said channel introduces a time delay for the liquid to propagate, dissolvable regions where said dissolvable regions Introduce certain time delays, and where the device may have a singularity or a plurality of said dissolvable regions, said regions being realized by for example a thin film of a resorbing polymer material (e.g. PVA). These different regions may thus provide means for having delayed events occurring in the device enabling handling of for example excess liquid.

The dissolvable region may be in contact with a structure that allows capillary filling once said region has been dissolved. The structure that allows capillary filling may be for example paper, cotton matrix, a hydrophilic micro channel or another porous medium allowing further liquid propagation by capillary action.

The microfluidic device may be formed as a laminate comprising a first layer of material forming the capillary channel, a second layer of material comprising dissolvable material, to form the at least one dissolvable membrane, and a third layer of material comprising the capillary means.

Thus the device may be fabricated in a simple manner.

The invention further relates to a use of a microfluidic device as disclosed herein, for dried blood spot sampling.

Conventional dried blood spot sampling suffer from providing an unknown sample volume of blood that is stored in a punch out disk of absorbent paper, and to inhomogeneous sample composition in the sample spot. By preparing a well-defined volume of blood stored in the absorbent paper and using the whole blood spot collected in the paper these drawbacks are reduced and the quality of tests performed on the blood spot may be increased.

The invention further relates to a method of fabricating a microfluidic device as disclosed herein comprising the steps of
providing a first layer of material forming the capillary channel,
providing a second layer of material comprising dissolvable material, to form the at least one dissolvable membrane,
providing a third layer of material comprising the capillary means, and
laminating the first, second and third layers of material, and any further layers such as cover layers, spacing layers, and/or further layers of material forming fluidic functions in the device, thereby forming a laminate comprising the microfluidic device.

Thus the microfluidic device may be fabricated in a simple and cost-efficient manner, suitable for mass fabrication.

The third layer of material may comprise at least one capillary channel or a structure that allows capillary filling, such as a porous absorbent material, preferably a layer of absorbent paper.

The lamination may be performed with a bonding region between two layers in the laminate, preferably comprising a heat or pressure sensitive adhesive, a reactive adhesive, wax of formed by means of surface activation or thermo compression.

The lamination may be performed in several subsequent steps of aligning and laminating the layers of material of the laminate.

The invention further relates to a method of controlling a flow of liquid in a microfluidic device comprising
providing liquid at an inlet port for liquid,
receiving liquid from the inlet port in a capillary channel in fluid connection with the inlet port,
providing at least one dissolvable valve comprising a dissolvable membrane having a first side oriented towards the capillary channel, and capillary means connected to a second side of the dissolvable membrane,
dissolving the membrane of the valve by the liquid and transporting liquid through the valve to the second side of the membrane by means of capillary action in the capillary means.

Thus a defined volume of liquid may be separated from an undefined volume of liquid provided to the inlet port.

The method may comprise defining and separating a defined volume of liquid from an undefined volume of liquid provided at the inlet port, and removing excess liquid from the inlet port.

Thus the liquid received in the capillary channel may be "pinched off" to provide a free liquid surface facing the inlet port.

The method may comprise receiving a volume of liquid in the capillary channel, from an undefined volume of liquid provided at the inlet port, initiating dissolution of the membrane by liquid received in the capillary channel, removing excess liquid at the inlet port before the membrane is dissolved, and thereafter transporting liquid to the second side of the membrane by means of capillary action in the capillary means, thus separating a defined volume of liquid from an undefined volume of liquid provided at the inlet port.

Thus the capillary channel may be filled to define a volume of liquid in the device, followed by release of the volume of liquid through the dissolvable membrane.

The inlet port may comprise an inlet chamber and wherein excess liquid at the inlet port is removed from the inlet chamber by providing at least one dissolvable membrane in connection to the inlet chamber, comprising material dissolvable by the liquid, having a first side oriented towards the inlet chamber, and capillary means connected to a second side of the dissolvable membrane,
dissolving the membrane by the liquid in the inlet chamber and
transporting liquid to the second side of the membrane by means of capillary action in the capillary means.

Thus the "pinch off" of liquid in the capillary channel may be provided efficiently.

The method may comprise releasing one or more portions of one or more substances, such as one or more regents and/or one or more particles, into the liquid by dissolving the at least one membrane covering at least one storage for the one or more substances.

The method may comprise releasing one or more substances, such as one or more regents and/or one or more particles, into the liquid by dissolving the at least one membrane comprising the one or more substances.

Thus a sequence of reactions may be achieved in the device.

The invention further relates to a method to control and time fluid flow in microfluidic systems with sacrificial dissolvable membranes wherein one or several dissolvable membranes that, by their dissolving times once in contact with a liquid, control the timing of events within the microfluidic device.

Thus a sequential operation of events in the microfluidic device may be achieved. The method further provides an enhanced fluid handling in microfluidic systems (e.g. separation of volumes, metering, valving, cascading). For actuating the dissolvable valves no additional actuation needed then the dissolving liquid itself. The method may preferably be used in capillary driven systems, where the contact between membrane and disintegrating fluid is achieved by capillary forces, and may be used to perform sequential operations in capillary driven systems. The dissolving time of the membranes may for example be controlled by the dissolvable film thickness and material. The dissolvable valves may furthermore be used to control the timing in a device in such a way that several different fluids that are applied simultaneously to different metering channels are released into a common microfluidic system in a certain order, controlled by the dissolving delay of the different membranes.

BRIEF DESCRIPTION OF DRAWINGS

The invention is now described, by way of example, with reference to the accompanying drawings, in which:

FIG. 1 shows a microfluidic device according to a first embodiment, The device is shown in (a) in a crossection along the capillary channel and (b) in a crossection across the capillary channel, defined by the plane A-A in (a).

FIG. 2 shows four steps (a)-(d) of fabrication of a microfluidic device as shown in FIG. 1.

FIG. 7 shows a crossection of a microfluidic device according to yet another alternative.

FIG. 8 shows a crossection of a microfluidic device according to yet a further alternative.

DESCRIPTION OF EMBODIMENTS

Figure 3:
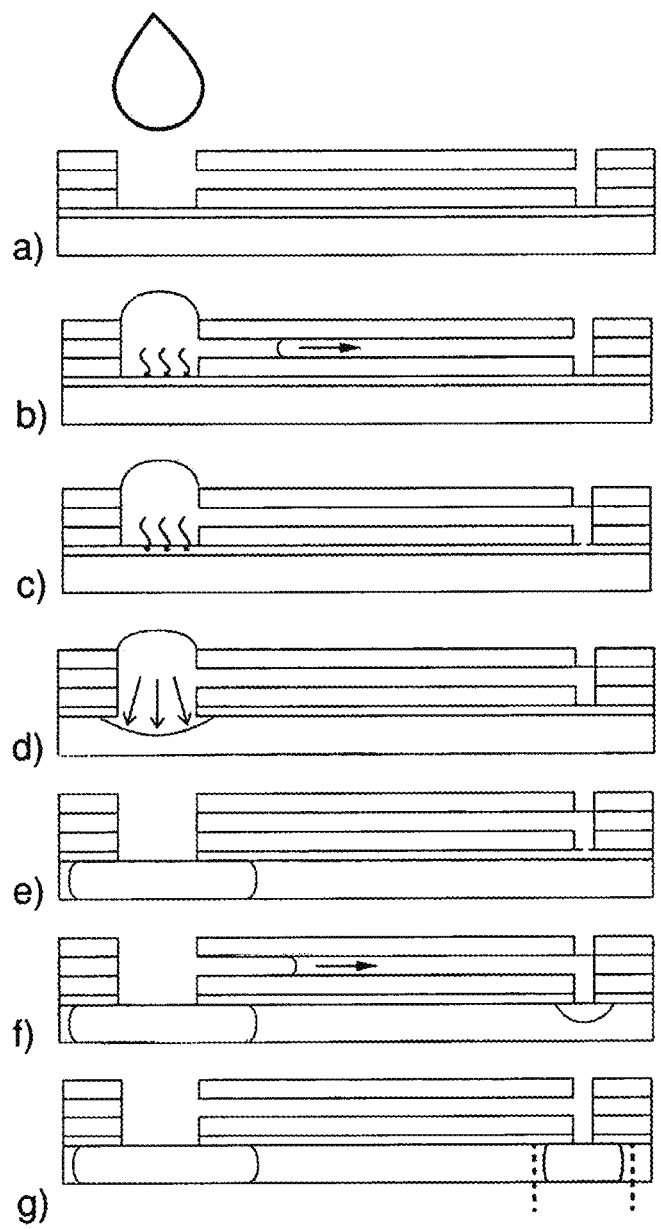
FIG. 3 shows seven steps of operation (a)-(g) of a microfluidic device as shown in FIG. 1.

In the following, a detailed description of embodiments of the invention is disclosed.

FIG. 1 shows a microfluidic device 101 according to a first alternative, comprising a capillary channel 103 having a defined volume and having an inlet portion 104 and an outlet portion 105. The inlet portion is connected to an inlet port 102 for liquid, such as a bodily fluid. The inlet port is arranged in connection to an inlet chamber 106 for receiving an undefined volume of liquid, such as about 30 µl.

The inlet chamber is in fluid connection to a first dissolvable valve 107 comprising a dissolvable membrane 108 and a capillary means 109 in the form of a layer of absorbing paper, such as Whatman 903 DBS paper. The membrane has a first side facing the liquid in the inlet chamber and a second side facing the capillary means such that when the membrane is dissolved by the liquid, liquid is transported through the valve to the second side of the membrane by capillary action. The membrane may be a layer of PVA obtained in the form of a sheet or film or prepared by spin-coating of a liquid solution of polyvinylalcohol (PVA), which is a water dissolvable thermoplastic polymer. It has excellent film forming and adhesion properties. It is nontoxic and used in various medical applications. The material has a high tensile strength and is flexible. PVA is a liquid soluble polymer and a 30 µm thick layer is dissolved by a drop of water within approximately 90 seconds. Thus the layer of PVA is preferably less than 20 µm, more preferably less than 10 µm, or even less than 5 µm to dissolve in less than 60 seconds, less than 30 seconds or less than 15 seconds. Preferably a PVA film thickness of 1-10 µm is used. The membrane 107 thus has a thickness much smaller than a lateral dimension of the membrane and thus allows for efficient dissolution by the liquid without loading the liquid with unnecessary amounts of dissolved material.

The outlet portion 105 of the capillary channel 103 is in capillary connection with a second dissolvable valve 110 comprising a dissolvable membrane 111 and a capillary means 112 in the form of a layer of absorbing paper, such as Whatman 903 DBS paper. The outlet portion 105 of the capillary channel 103 further connected to a vent port 113 for venting air from the channel during capillary filling with the liquid.

The microfluidic device 101 shown in FIG. 1 is in the form of a multilayered device comprising three layers 114, 115 and 116 defining the microfluidic structures forming the inlet chamber 106, the capillary channel 103 and the vent port 113. The dissolvable membranes 108 and 111 of the respective dissolvable valves 107 and 110 are formed by a layer 117 of dissolvable PVA, and the capillary means 109 and 112 by a layer 118 of absorbing paper.

In relation to FIG. 2, a method of fabricating a microfluidic device is disclosed. The films 114, 115 and 116 defining the inlet chamber 106, the capillary channel 103 and the vent port 113 each are manufactured from polymer transparency "Xerox" films and the fluidic structures cut by means of a cutting plotter. Thereafter the respective films are aligned and laminated (a) and (b). A spacer layer 119 was cut to allow for individual positioning of the first 108 and second 111 membrane layer, and a first and second portion of absorbing paper forming the first 109 and second 112 capillary means of the respective first 107 and second 110 dissolvable valve. A backing film 120 is arranged to hold the paper and membrane layers in place.

In the example shown here the chip design of the device consisted of six layers of different transparencies, two 1.6× 1.6 cm² Whatman 903® paper inlays per chip and two approximately 1×1 cm² sheets of PVA. These components were laminated together in 5 different steps. The lamination process started with laminating the channel layer and the outlet layer (or channel bottom) using the heat sensitive adhesive of a double-sided adhesive tape. The other side of the tape was protected with a liner (yellow paper) during this process step. Next, the inlet layer (or channel cover) was aligned and laminated to the channel geometries using the cold glue side of the double-sided adhesive tape after removing the liner. This stack of three layers defined the channel geometries and therefore the metering volume of the chip. The microfluidic layers could then be laminated together with the PVA and a spacer layer. In this lamination step, the PVA sticks to the smooth Xerox surface as PVA is a thermoplastic material with a glass transition temperature Tg of ~75-80° C. The last step to finish the fabrication of the chip was to add the paper inlays for storing the excess as well as the metered volume of liquid. The small paper squares that were prepared with a cutter were place in the intended openings in the spacer layer. To attach them to the chip, the backside cover of the chip was laminated, bonding with its adhesive surface to the spacer layer and the paper inlays. Openings in the backside cover of the chip allowed drying of the fluids stored in the paper. The opening underneath the outlet was dimensioned so that the dried metered volume will be within the boundaries of the opening so that the spot can be easily punched out. All lamination steps were performed at a temperature of 105° C.

In FIG. 3 the operation (a)-(g) of a microfluidic device as shown in FIG. 1 is illustrated. A drop of liquid, such as blood or other bodily fluid, is provided to the inlet port and at least partly filling the inlet chamber (a). When the liquid is provided in the inlet port, the liquid enters into the capillary channel 103 and starts filling the channel by capillary action (b). Simultaneously the liquid in the inlet chamber starts dissolving the dissolvable membrane 108 of the first dissolvable valve 107. In (c) the capillary channel is filled and the liquid has reached the second dissolvable valve 110 at the outlet side of the capillary channel. Thus the first dissolvable valve has already partly been dissolved, during the time needed to fill the capillary channel by the liquid, e.g. 1-5 seconds depending on the properties of the capillary channel. The time to dissolve the first and the second dissolvable valves, from liquid contact, are the same since they are formed by dissolvable membranes having the same thickness. However, the thickness of the membranes and thus the time needed to dissolve the membrane and open the valve may be individually tailored for each valve. Thus, the dissolvable valve 107 is opened before the second dissolvable valve 110 (d), whereby liquid in the inlet chamber is transported through the valve into the capillary means, in this case the absorbing paper. Due capillary action in the capillary channel, the liquid volume in the channel is "pinched off", thus forming a free liquid surface facing the inlet chamber, when the inlet chamber is emptied from liquid (e). The excess liquid in the inlet chamber is absorbed in the capillary means. Thus a well-defined volume of liquid is separated from the undefined volume of liquid provided to the inlet port. Thereafter, the membrane of the second dissolvable valve is dissolved (f) and the valve is opened, whereby the liquid in the capillary channel is transported to the other side of the membrane by the capillary means in the form of the absorbing paper. Finally, when the liquid is completely absorbed in the paper (g), a portion of the paper containing the liquid may be cut out for further processing or analysis.

Thus the main steps of the method of defining a volume of liquid by the device are:
1 Applying droplet; inlet valve starts dissolving; channel starts filling,
2 Channel is completely filled; outlet valve starts dissolving
3 Inlet is valve completely dissolved; liquid starts to suck into the paper; pinch-off at the inlet portion of the channel, and
4 Outlet valve is completely dissolved; fluid volume inside the channel is transferred into paper matrix.

Figure 4:
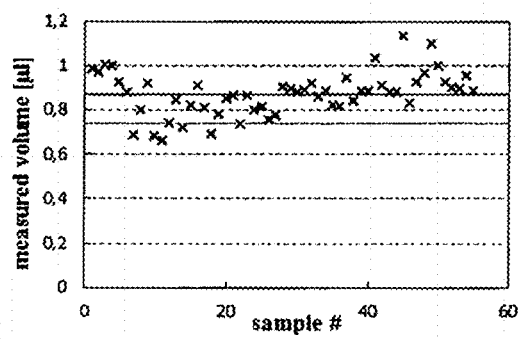
FIG. 4 shows an example of volume metering by a plurality of microfluidic devices.

In FIG. 4 an example of volume metering by a plurality of microfluidic devices is shown. The graph shows the measured volume of 55 devices together with the average volume (dark solid line) of 0.87 µl surrounded by lines defining standard deviation (light solid line) of ±0.1 µl.

The microfluidic device may e.g. be used in Dried Blood Spot Sampling (DBS). With increased sensitivity in analysis techniques such as LC-MS/MS (liquid chromatography tandem mass spectroscopy), DBS sampling is considered to be a simple and convenient alternative to venous blood sampling, especially interesting for Therapeutic Drug Monitoring (TDM). However, conventional DBS sampling stores an unknown volume of blood from a fingerprick in a paper matrix, thus making quantitative analysis inaccurate and imprecise. The problem with quantitative analysis of DBS stems from the unknown volume that is stored in a punched out disk from the spot. Inhomogeneous distribution of analytes within the spot is caused by variations in hematocrit value and chromatographic effects in the paper. The microfluidic device as disclosed herein allows for accurate volume metering for lateral flow devices and is thus suitable for metering blood spots for DBS analysis. The whole spot of blood absorbed in the paper at the outlet region may now be punched out, reducing problems with inhomogeneity within dried blood spots. Since the volume has been metered in the microchannel, spot inhomogeneity is no longer a concern.

Figure 5:
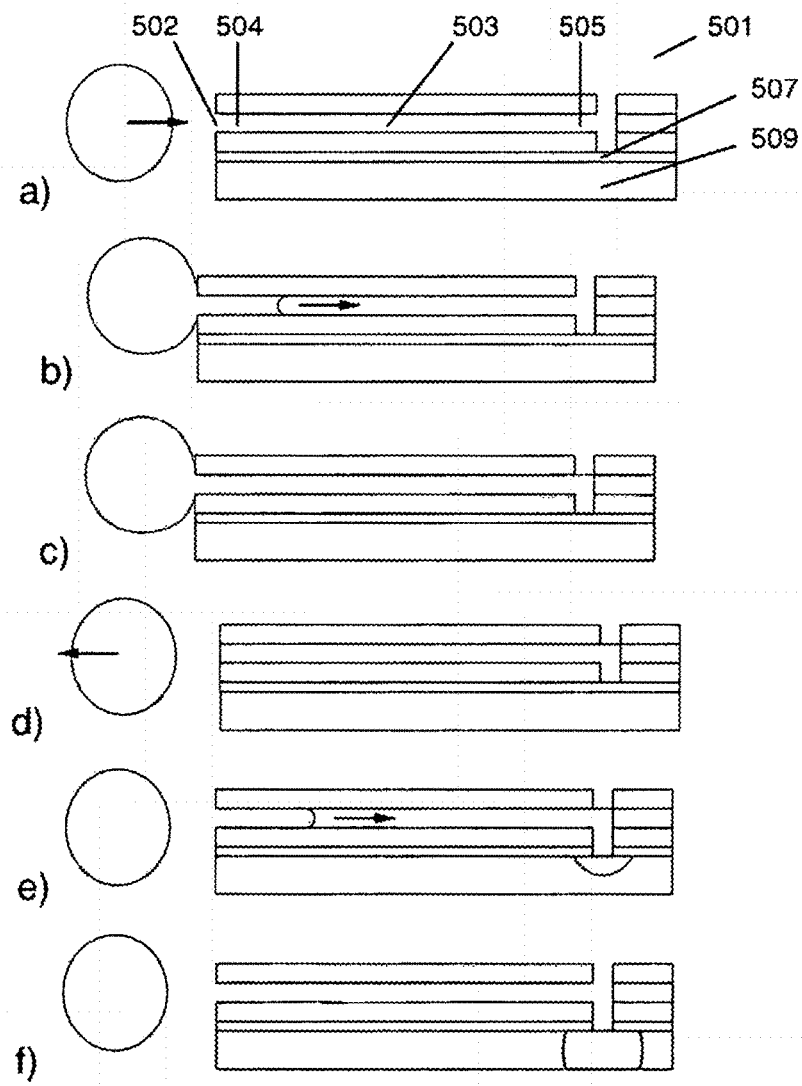
FIG. 5 shows a crossection of a microfluidic device according to another alternative, with six steps of operation (a)-(f).

In FIG. 5 a microfluidic device 501 according to an alternative embodiment is shown. The embodiment is similar to the one disclosed in relation to FIG. 1, but in this embodiment the device is provided with only one dissolvable valve 507, provided in connection with the outlet portion 505 of the capillary channel 503. The inlet port 502 is the end of the inlet portion 504 of the capillary channel 503. Also in this case the device may e.g. be used to define a volume of blood for DBS sampling.

A liquid droplet of undefined volume is provided to the inlet port 502 of the device (a). Liquid from the droplet starts filling the capillary channel 503 by capillary action (b), until the channel is completely full (c). Once the channel is full of liquid, the liquid is brought into contact with the dissolvable valve 507. Thereafter the drop of remaining liquid is removed, and the volume of liquid in the capillary channel is "pinched off", forming a free liquid surface at the inlet port. When the dissolvable valve is dissolved, the well defined volume of liquid in the capillary channel is transported through the valve into the capillary means, in the form of an absorbing paper matrix. Thereby a well-defined volume of liquid is separated from the undefined volume of the drop of liquid provided to the inlet port.

Figure 6:
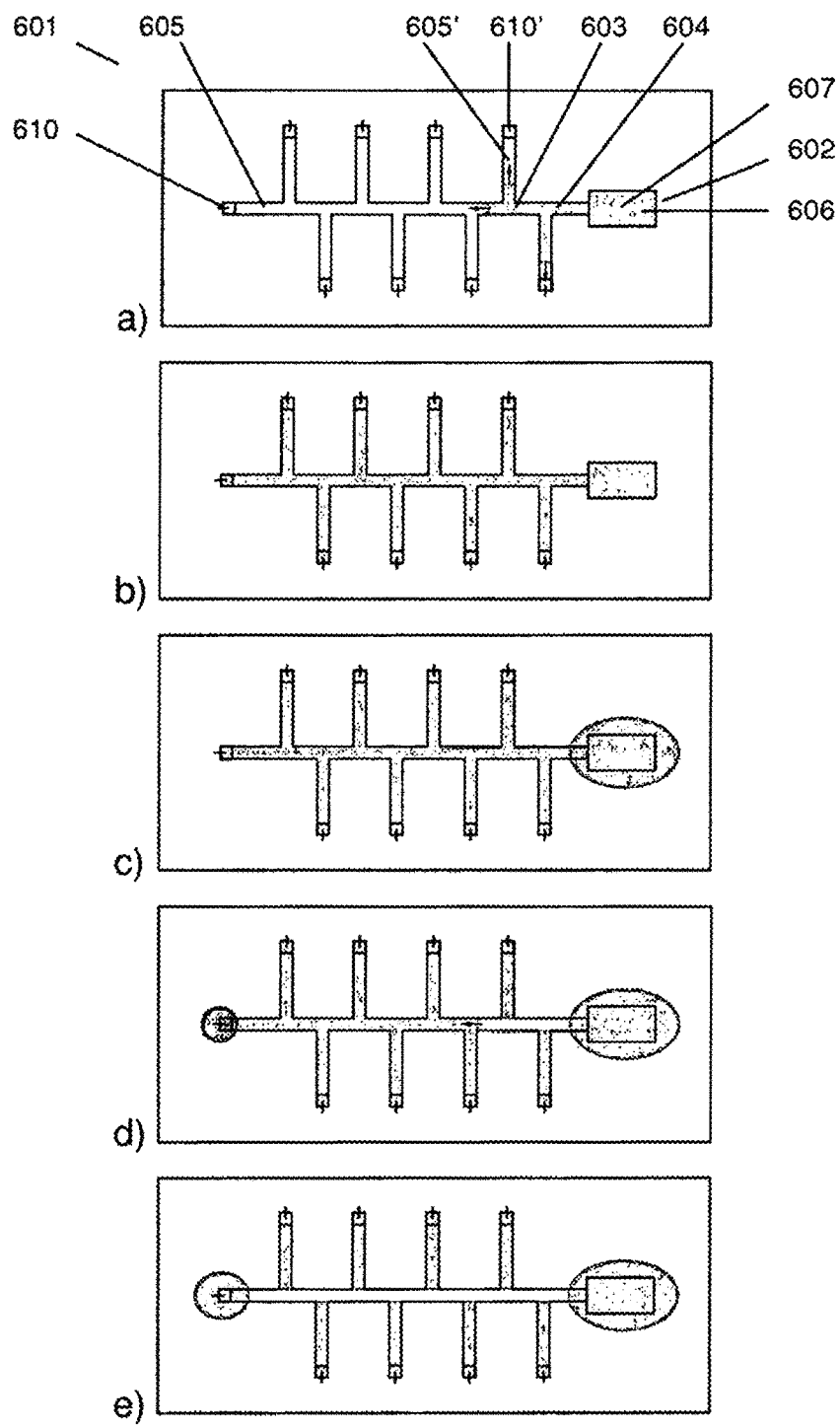
FIG. 6 shows a microfluidic device according to a further alternative, with seven steps of operation (a)-(g).

In FIG. 6 a microfluidic device 601 according to a further alternative is shown, comprising a capillary channel 603 having a defined volume and having an inlet portion 604 and a first outlet portion 605. The inlet portion is connected to an inlet port 602 for liquid, such as a bodily fluid. The inlet port is arranged in connection to an inlet chamber 606 for receiving an undefined volume of liquid and connected to a dissolvable inlet valve 607. The first outlet portion is capillary connected to a first dissolvable outlet valve 610.

The capillary channel further comprises a branched capillary channel structure comprising a plurality of side arms each defining a further outlet portion 605' of the capillary channel. Each further outlet portion 605' of the capillary channel is connected to a further dissolvable outlet valve 610'. The device thus comprises a plurality of dissolvable valves 607, 610 and the plurality of valves 610'. The capillary channel is thus connected to a plurality of dissolvable outlet valves, distributed along a capillary flow path of liquid in the microfluidic device.

During operation of the device, liquid is supplied to the inlet port 602, at least partially filling the inlet chamber 606. The dissolvable valve 607 at the inlet then starts dissolving. Liquid is drawn into the inlet portion 604 of the capillary channel, and into the side arms of the capillary channel (a). The capillary channel structure is thereafter filled with liquid (b) and each of the dissolvable valves 610, 610' at the respective outlet portions 605, 605' starts dissolving. As a next step, the dissolvable valve at the inlet is opened (c), whereby any excess liquid in the inlet chamber is transported through the valve and into the capillary means. A free liquid surface is formed at the inlet portion of the capillary channel. The dissolvable valve 605 at the first outlet portion is preferably configured to be dissolved before the dissolvable valves 605' at the respective side arms. Thus when the dissolvable valve 610 at the first outlet portion opens (d), the volume of liquid in the main capillary channel is drawn towards the first outlet valve and into the capillary means provided there. During this step, free liquid surfaces are formed in the side arms of the capillary structure, facing the main capillary channel (e). The outlet valves 610' at the respective outlet portion 605' of the side arms thereafter open, either simultaneously as shown in (f), or in sequence, whereby the defined volume of liquid available in the respective side arm is transported into the capillary means in connection to the respective outlet valve 610' (g). Thereby, from the undefined volume of liquid supplied to the inlet port, a number of defined volumes of liquid are separated for further processing or analysis.

In FIG. 7 a crossection of a microfluidic device according to yet another alternative is disclosed. The device comprises a microchannel 703 connected to a first inlet port 702 provided with a dissolvable inlet valve 707, and a dissolvable outlet valve 710 connected to an outlet portion of the capillary channel. The device differs from what is disclosed in relation to FIG. 1 in the following. In the capillary channel 703, a film 724 of dissolvable material is provided, which incorporates a substance to be released into the liquid. The substance may be a reagent. Further, the capillary means 712, provided on the second side of the dissolvable membrane 711 of the dissolvable outlet valve, is formed by a further capillary channel 725 leading into a reaction space 721. The reaction space may be provided with an inlet port 722 for another liquid, such as a further reagent or a sample liquid. The reaction space may be filled with an absorbing material 723, such as an absorbing paper matrix. Such a dissolvable film incorporating a substance to be released into the liquid, and/or the capillary means comprising a capillary channel connected to a reaction space, may be provided together with any one of the other microfluidic devices disclosed herein.

During operation of the device a drop of liquid, is provided to the inlet port 702 and at least partly filling the inlet chamber. When the liquid is provided in the inlet port, the liquid enters into the capillary channel 703 and starts filling the channel by capillary action. Simultaneously the liquid in the inlet chamber starts dissolving the dissolvable membrane of the first dissolvable valve 707. The dissolvable film 724 in the microchannel also starts dissolving upon filling the channel with liquid. When the capillary channel is filled and the liquid has reached the second dissolvable valve 710 at the outlet side of the capillary channel this starts dissolving. The dissolvable valve 707 is opened before the second dissolvable valve 710, whereby liquid in the inlet chamber is transported through the valve into the capillary means, in this case the absorbing paper. Due to capillary action in the capillary channel, the liquid volume in the channel is "pinched off", thus forming a free liquid surface facing the inlet chamber, when the inlet chamber is emptied from liquid. The excess liquid in the inlet chamber is absorbed in the capillary means. Thus a well-defined volume of liquid is separated from the undefined volume of liquid provided to the inlet port. The liquid in the capillary channel then has dissolved the film 724 and is thus loaded with the substance incorporated in the film. Thereafter, the membrane of the second dissolvable valve is dissolved and the valve is opened, whereby the liquid in the capillary channel, including the substance, is transported to the other side of the membrane by the capillary means in the form of the capillary channel 725 and into the reaction space 721 where it is absorbed in the paper 723. A further sample of liquid may then be added to the reaction space through the inlet 722 and reacted with the first liquid, or the substance carried by the first liquid.

In FIG. 8 shows an embodiment of two dissolvable valves 810 and 826 arranged sequentially along a flow path of liquid in the device. The liquid flow path comprises a first capillary channel 803 leading up to a first dissolvable valve 810. The dissolvable valve 810 comprises a membrane 811 having a first and a second side and the capillary means are formed by a capillary channel 825 connected to the second side of the membrane. The second dissolvable valve 826 comprises a membrane 827 having a first and a second side. The capillary channel 825 is connected to a first side of the membrane and the capillary means are formed by a capillary channel 828 connected to the second side of the membrane. Air vents 830 and 831 are provided close to the first side of the respective membranes 811 and 827. The membranes of the two dissolvable valves are formed by a single layer of dissolvable film extending throughout the structure. The embodiment may be used in combination with any of the devices as disclosed herein, to provide a sequential timing of fluid flow operations in the devices.

During operation, liquid fills the capillary channel 803 and starts dissolving the membrane 811 of the first dissolvable valve 810. Thus the propagation of liquid is held a period of time corresponding to the time needed to dissolve the membrane. Once the membrane of the valve is dissolved, the liquid is transported to the second dissolvable membrane 827 by means of the capillary channel 825, and starts dissolving the membrane. Again the propagation of liquid is held a period of time corresponding to the time needed to dissolve the membrane, and once the membrane of the valve is dissolved, the liquid is transported to through the valve and into the capillary channel connected to the second side of the dissolvable membrane 827.

Figure 9A:
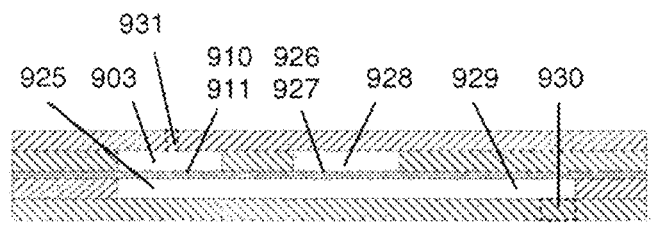
FIG. 9 (a) shows crossection of a microfluidic device having a plurality of membranes and a plurality of dead end capillary channels with the operation of the device illustrated in (b)-(c).
Figure 9B:
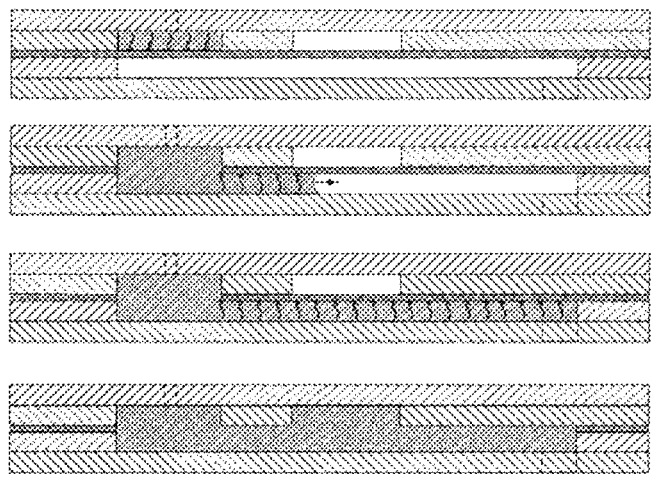
Figure 9C:
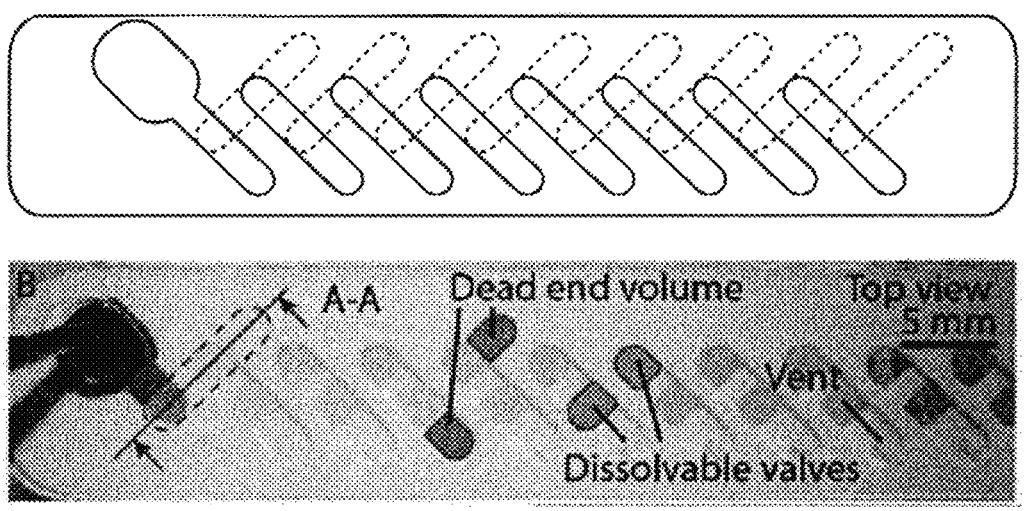

In FIG. 9 (*a*) a crossection of a microfluidic device according to a further embodiment is disclosed. The device is provided with a first capillary channel 903 connected to a first dissolvable valve 910. On the other side of the dissolvable valve, a capillary channel 925 is connected, leading towards a second dissolvable valve 926 having a dissolvable membrane 927 with a first and a second side, wherein the first side is facing the capillary channel 925 and the second side is connected to a capillary means in the form of yet another capillary channel 928. The capillary channel 925 extends past the second valve to form a dead end channel 929. An air vent 930 is provided in the dead end chamber and one air vent 931 before the valve 910. This dead end channel or chamber is configured such that liquid dissolving the membrane is transported into the capillary dead end channel by capillary forces. Thus liquid loaded with dissolved material of the membrane may be led into the capillary dead end channel to allow for liquid having less amount of dissolved material to propagate through the valve once dissolved.

In FIG. 9 (*b*) the operation of the device is illustrated in a sequence of steps. The first dissolvable valve is dissolved and the liquid is transported into the capillary channel 925. Upon reaching the second dissolvable valve, the membrane of this valve starts dissolving, while liquid still propagates into the dead end channel, thus bringing any dissolved material along. Therefore, once the membrane of the second dissolvable valve is dissolved, most of the dissolved material is accumulated in the dead end channel, and fresh liquid starts to propagate into the capillary channel behind the second dissolvable valve.

In FIG. 9 (*c*) an example of a cascading dissolvable valve system is shown, each valve being provided with a respective dead end volume for accumulating dissolved material from the respective dissolvable membrane. Each dead end volume is also provided with an air vent to allow for capillary filling of the channel and dead end volume. Thus, according to this embodiment, at every dissolvable membrane, e.g. along a flow path of liquid in the device, the liquid loaded with dissolved material of the membrane may be led into a respective capillary dead end channel and accumulated to allow for liquid having less amount of dissolved material to propagate through the membrane once dissolved, and throughout the device.

The invention claimed is:

1. A metering microfluidic device comprising
an inlet port for delivering a volume of liquid,
a metering capillary channel in fluid connection to the inlet port for receiving liquid from the inlet port, the metering capillary channel having an inlet portion, an outlet portion and a defined volume, and
at least one first dissolvable valve comprising a first dissolvable membrane having a first side oriented towards the metering capillary channel, and a capillary means, wherein the capillary means is formed of a layer of porous absorbent material and connected to a second side of the first dissolvable membrane such that when the first dissolvable membrane is dissolved by the liquid, liquid is transported through the at least one first dissolvable valve to the second side of the first dissolvable membrane by capillary action,
wherein the at least one first dissolvable valve is in capillary connection to the outlet portion of the metering capillary channel and arranged for transporting a metered volume of liquid from the metering capillary channel to the capillary means when the first dissolvable membrane is dissolved,
wherein at least one layer of dissolvable material forms the first dissolvable membrane, and the layer of porous absorbent material contacts the at least one layer of dissolvable material, and
wherein a laminate of layers of material define a flow path for the liquid and comprises the at least one layer of dissolvable material forming the first dissolvable membrane and the layer of porous absorbent material forming the capillary means.

2. A metering microfluidic device according to claim 1, comprising
a second dissolvable membrane connected to the inlet port,
wherein the capillary means is adapted for removing liquid supplied to the inlet port which is in excess of the liquid delivered to the metering capillary channel when the second dissolvable membrane is dissolved by liquid and for removing liquid from the outlet portion when the first dissolvable membrane is dissolved by liquid, and
wherein the first and second dissolvable membranes and the metering capillary channel are configured such that the second membrane is dissolved by the excess liquid before the first membrane is dissolved.

3. The microfluidic device according to claim 1, wherein the inlet port comprises an inlet chamber for receiving liquid and wherein a second dissolvable valve comprising a second dissolvable membrane is connected to the inlet chamber for transporting excess liquid from the inlet chamber to the capillary means when the second dissolvable membrane of the second dissolvable valve is dissolved.

4. The microfluidic device according to claim 1, wherein the metering capillary channel comprises a main capillary channel and a plurality of capillary side channels arranged along the main capillary channel and the capillary side channels are connected to a respective plurality of side channel dissolvable valves, respectively comprising dissolvable membranes, wherein the capillary means is connected to the respective plurality of side channel dissolvable valves to collect liquid from the plurality of side channel dissolvable valves.

5. The microfluidic device according to claim 1, wherein the device further comprises a plurality of dissolvable valves, distributed along a capillary flow path comprising the metering capillary channel.

6. The microfluidic device according to claim 5, wherein the metering capillary channel comprises a branched capillary channel structure comprising a plurality of capillary side arms connected to the plurality of dissolvable valves.

7. The microfluidic device according to claim 1, wherein the first side of the first dissolvable membrane of the dissolvable valve is also connected to a capillary dead end channel, configured such that liquid dissolving the first dissolvable membrane is transported into the capillary dead end channel by capillary forces.

8. The microfluidic device according to claim 7, further comprising a plurality of dissolvable valves arranged in series along the metering capillary channel and connected to a respective plurality of capillary dead end channels.

9. The microfluidic device according claim 1, wherein the first dissolvable membrane comprises at least one reagent or particle to be released into the liquid.

10. The microfluidic device according to claim 1, comprising a plasma separation membrane for separating plasma from whole blood.

11. The microfluidic device according to claim 1, wherein the laminate comprises a first layer of material forming the metering capillary channel.

12. The microfluidic device according to claim 1, wherein the porous absorbent material is an absorbent paper matrix.

13. A method of providing a metered volume of liquid sample in a microfluidic device according to claim 1, comprising
(i) introducing a liquid sample with an undefined volume to the inlet port,
(ii) metering a defined volume of the liquid sample by filling the metering capillary channel, wherein the defined volume is less than the undefined volume,
(iii) removing liquid which is in excess of the defined volume from the inlet port,
(iv) dissolving the at least one first dissolvable valve comprising the first dissolvable membrane, and
(v) transporting the metered liquid through the at least one first dissolvable valve to the second side of the first dissolvable membrane by means of capillary action in the capillary means.

14. The method according to claim 13, wherein the porous absorbent material is an absorbent paper matrix.

15. The method according to claim 13 wherein the inlet port comprises an inlet chamber, wherein the excess liquid is removed from the inlet port by providing at least one dissolvable membrane in connection to the inlet port, said inlet port dissolvable membrane comprising material dissolvable by the liquid, having a first side oriented towards the inlet chamber, and an inlet capillary means connected to a second side of the inlet port dissolvable membrane, the method comprising
dissolving the inlet port dissolvable membrane by the excess liquid, and
transporting the excess liquid to the second side of the inlet port dissolvable membrane by means of capillary action in the inlet capillary means.

16. A metering microfluidic device, comprising
an inlet port for delivering a volume of liquid,
a metering capillary channel in fluid connection to the inlet port for receiving liquid from the inlet port, the metering capillary channel having an inlet portion, an outlet portion and a defined volume, and
at least one dissolvable valve comprising a dissolvable membrane having a first side oriented towards the metering capillary channel, and a capillary means connected to a second side of the dissolvable membrane such that when the dissolvable membrane is dissolved by the liquid, liquid is transported through the at least one dissolvable valve to the second side of the dissolvable membrane by capillary action,
wherein the at least one dissolvable valve is in capillary connection to the outlet portion of the metering capillary channel and arranged for transporting a metered volume of liquid from the metering capillary channel to the capillary means when the dissolvable membrane is dissolved,
wherein a laminate of layers of material define a flow path for the liquid and comprises at least one layer of dissolvable material forming the dissolvable membrane, and
wherein the device comprises a plurality of dissolvable membranes formed by one and the same layer of dissolvable material in the microfluidic device.

17. The microfluidic device according to claim 16, wherein the flow path further comprises additional capillary channels on both sides of the layer of dissolvable material, wherein a plurality of dissolvable valves comprising the plurality of dissolvable membranes are formed at flow path crossings across the layer of dissolvable material.

* * * * *

UNITED STATES PATENT AND TRADEMARK OFFICE
CERTIFICATE OF CORRECTION

| | |
|---|---|
| PATENT NO. | : 10,220,389 B2 |
| APPLICATION NO. | : 15/025524 |
| DATED | : March 5, 2019 |
| INVENTOR(S) | : Göran Stemme et al. |

Page 1 of 1

It is certified that error appears in the above-identified patent and that said Letters Patent is hereby corrected as shown below:

On the Title Page

Item (30), change "1300623" to --1300623-4--.

Signed and Sealed this
Eleventh Day of June, 2019

Andrei Iancu
*Director of the United States Patent and Trademark Office*